(12) United States Patent
Islam et al.

(10) Patent No.: US 7,992,024 B2
(45) Date of Patent: Aug. 2, 2011

(54) FIREWALL/ISOLATION CELLS FOR ULTRA LOW POWER PRODUCTS

(75) Inventors: Rabiul Islam, Austin, TX (US); Michael C Phillips, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 660 days.

(21) Appl. No.: 12/056,482

(22) Filed: Mar. 27, 2008

(65) Prior Publication Data

US 2009/0243710 A1 Oct. 1, 2009

(51) Int. Cl.
*G06F 1/32* (2006.01)

(52) U.S. Cl. ............. 713/323; 713/324; 326/21; 326/62

(58) Field of Classification Search .................. 713/300, 713/323, 324; 326/21, 62
See application file for complete search history.

(56) References Cited

U.S. PATENT DOCUMENTS

| 5,424,659 | A  | * | 6/1995 | Stephens et al. | 326/81 |
| 7,167,017 | B2 | * | 1/2007 | Arora et al. | 326/21 |
| 7,215,563 | B2 | * | 5/2007 | Brandon et al. | 365/94 |
| 7,805,621 | B2 | * | 9/2010 | Kendall et al. | 713/300 |

* cited by examiner

*Primary Examiner* — Thuan N Du
(74) *Attorney, Agent, or Firm* — Blakely, Sokoloff, Taylor & Zafman LLP

(57) ABSTRACT

In an integrated circuit (IC) may have several functional blocks adapted to be inactivated independently from each other. At least one firewall cell may be embedded independently of other firewall cells in the vicinity of one functional block. The firewall cell may be electrically isolated from the functional block and may be powered by a constantly supplied voltage source in the IC. Firewall cells may be embedded in free locations on the IC in the functional block domain according to a design that may be free of constraints such as firewall cells array of firewall cells mini-island.

10 Claims, 3 Drawing Sheets

US 7,992,024 B2

FIREWALL/ISOLATION CELLS FOR ULTRA LOW POWER PRODUCTS

BACKGROUND OF THE INVENTION

Power management in an integrated circuit (IC) may be embodied by way of defining various domains on the IC and a domain may comprise a number of functional blocks. Each of the blocks may be allowed to be switched off according to certain modes of operations of the IC and/or during certain cycles of operation of the IC, thus reducing the consumption of power of a block to a very low level associated with idle state or inactive state of that block.

Tight power management has a special importance in portable small electronic devices, such as handheld Personal Digital Assistant (PDA) devices, personal handheld computers, cellular phones and the like. In order to ensure proper operation of the active blocks on the IC the inactive blocks are typically isolated from the active blocks, to prevent leakage of power or unwanted propagation of signals. The isolation may be done by means of isolation cells (also known as a 'firewall'). Firewall cells are typically arranged in defined areas on the chip, as depicted in FIG. 1. IC 10 may comprise a plurality of functional blocks such as block 12 and block 16 which may be powered through gated voltage supplies $Vccg_1$ and $Vccg_2$, respectively. Block 12 may comprise at least one active unit 13 and block 16 may comprise at least one active unit 17. Active unit 13 and/or active unit 17 may be a logical unit such as a processor, a gate array, etc., an analog unit such as an analog amplifier, a Radio Frequency (RF) unit etc. At least one output of unit 13 may be the input to unit 17. In order to enable logical and electrical isolation of block 12 from block 16, in cases when one of them is powered and active and the other one is inactive, such as in 'sleep' mode, an array 14 of firewall cells 20 may be embodied in or on IC 10. Array 14 is powered by an un-gated voltage supply $Vcc_1$ and is electrically isolated from blocks 12 and 16 on chip 10, as depicted by the outer frame of block 14. The operation of firewall cells 20 is controlled by a power management unit 18, which may also control the connection or disconnection of gated voltage supplies to blocks 12 and 16. Firewall cells array 14 is powered from voltage source or sources which are constantly available, as long as the chip operates. The required supplies of different voltages to block 12 and block 16 are gated voltage supplies $Vccg_1$ and $Vccg_2$; the required supply of voltage to the associated firewall cells array 14, $Vcc_1$ is an un-gated voltage supply. This dictates that the area occupied by firewall cells array 14 be electrically isolated from the neighboring blocks. Electrical isolation of blocks 12 and 16 and of array 14 from one another may be embodied by any known method, such as using N-well technique. Firewall cells 20 may be embodied as a combination of logic units. Power management unit 18 may control the supply of power to blocks 12 and 16 and the operation of firewall cells 20 associated with blocks 12 and 16 so as to isolate block 12 from block 16 when block 12 is shut down by disabling firewall cells 20 and to re-connect the block back to block 16 when it is put back to operation by enabling firewall cells 20. Typically firewall cells 20 are arranged in arrays so that ungated voltage supply is received from a respective supply layer and may be provided to all cells 20 in array 14. Electrical isolation of array 14 from neighboring blocks cells 20 provides the required isolation of all firewall cells 20 in array 14.

BRIEF DESCRIPTION OF THE DRAWINGS

The subject matter disclosed in this application is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings in which:

Figure 1:
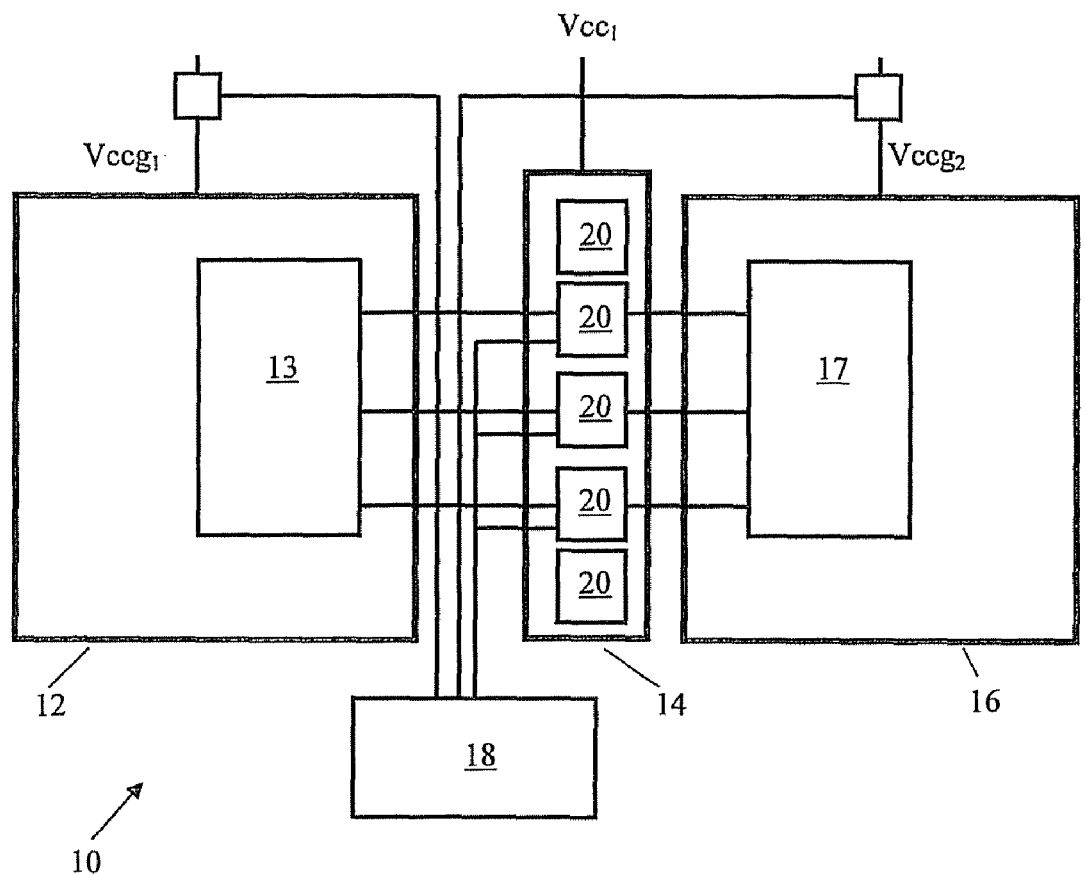
FIG. 1 is a schematic block diagram of isolation arrangement as known in the art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of embodiments of the invention. However, it will be understood by those of ordinary skill in the art that embodiments of the present invention may be practiced without these specific details. In other instances, well-known methods, procedures, components and circuits have not been described in detail so as not to obscure embodiments of the present invention.

The processes and devices presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of embodiments of the invention as described herein.

Various embodiments may be implemented in many wireless, handheld and portable communication devices. By way of example, wireless, handheld and portable communication devices may include wireless and cellular telephones, smart telephones, personal digital assistants (PDAs), web-tablets and any device that may provide wireless access to a network such, an intranet or the Internet. It should be understood that embodiments of the present invention may be used in a variety of applications.

Figure 2:
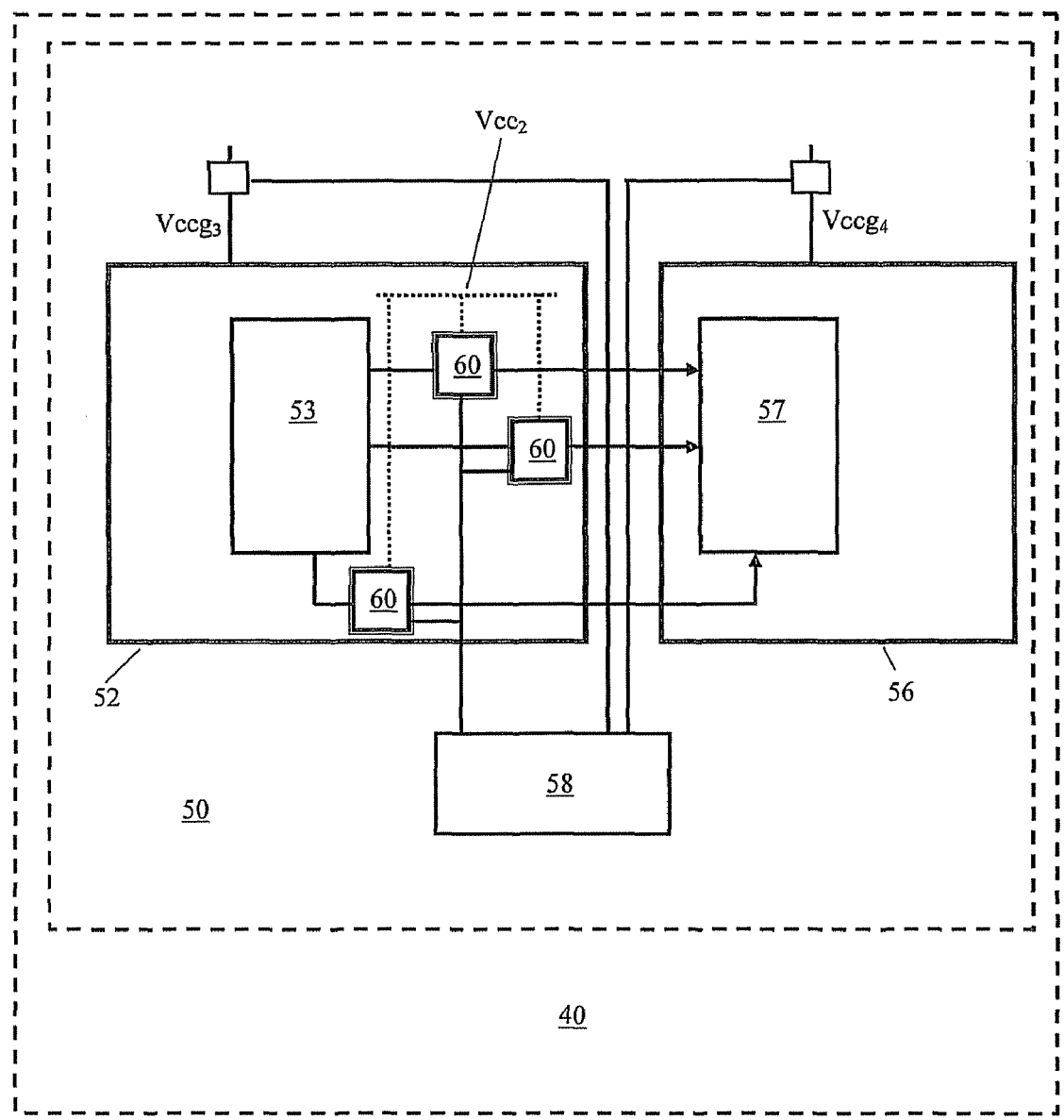
FIG. 2 is a schematic block diagram illustration of a system with a chip having an isolation arrangement between on-chip functional blocks, according to embodiments of the present invention.

Integrated circuits (ICs) according to embodiments of the present invention may enable power management to various functional blocks within the IC and may include for example a power management unit to control the switching ON or OFF the power supply to various blocks and accordingly to enable or disable flow of signals through associated firewall cells. FIG. 2 is a schematic block diagram illustration of a system 40 with at least one IC 50 having an isolation arrangement between on-chip functional blocks, according to embodiments of the present invention. IC 50 may comprise a plurality of functional blocks, such as blocks 52 and 56, a plurality of firewall cells 60 and a power management unit 58. Functional blocks 52 or 56 may be a digital logic unit such as a graphics processor, a video processor, a display interface unit, or an analog unit such as a PLL, a high speed IO interface, etc.

Figure 3:
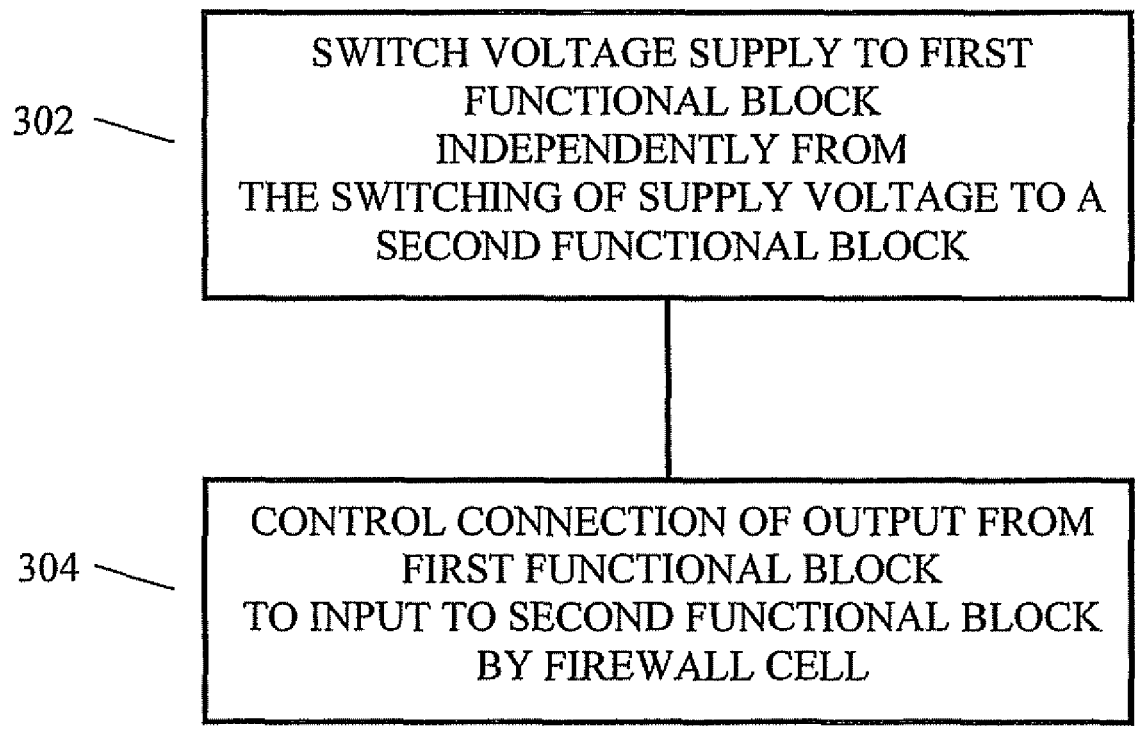
FIG. 3 is a flow diagram of an operation of system with a chip having an isolation arrangement between on-chip functional blocks, according to embodiments of the present invention.

Reference is made now also to FIG. 3, a schematic flow diagram of an operation of system with a chip having an isolation arrangement between on-chip functional blocks, according to embodiments of the present invention. Blocks such as functional blocks 52 and 56 may be powered through for example gated voltage supplies Vccg3 and Vccg4, respectively, which may be switched ON or OFF at times independent of each other (block 302), as may be required according to, for example, a policy of operation of IC 50. Functional block 52 may comprise at least one active unit 53 and functional block 56 may comprise at least one active unit 57. Active unit 53 and/or active unit 57 may be for example a logical unit such as a processor, a gate array, etc., an analog unit such as an analog amplifier, a Radio Frequency (RF) unit etc.

At least one output of unit 53 may be the input to unit 57. Functional blocks 52 and 56 may be operated according to an operational scheme that may allow, or require, that at certain times block 52 is disconnected from a voltage supply and set in an inactive, power-down, or 'sleep' mode while block 56 is connected to voltage supply and is operational. In order to prevent signal leakage between the operational functional block 56 and the disabled functional block 52 any number of firewall cells 60 may be placed at any location in block 52 that is desired, as much as the design of block 52 permits. The location of each of firewall cells 60 may be independent of each other. Firewall cells 60 may be used to switch ON or OFF an output signal from functional block 52 to functional block 56 (block 304). The activation of firewall cells 60 to switch ON or OFF said signal may be done in coordination with the switching of gated voltage supply Vccg3 ON or OFF, respectively. Power management unit 58 may control gating of voltage supplies Vccg3 and Vccg4 ON or OFF and may control the activation of firewall cells 60 in coordination with them.

Firewall cells 60 may be embodied as single cells or in groups of two or more firewall cells embedded in functional block 52, as the design of the IC layout may dictate. As seen in FIG. 2, firewall cells 60 may be designed and implemented anywhere in block 52, for example. Thus some embodiments may differ from the traditional solution of arrays of firewall cells, as depicted for example in FIG. 1. Having firewall cells placed anywhere needed and in any number of cells needed in IC 50, according to embodiments of the present invention, may render a more efficient utilization of the area of IC 50, while preserving all the functional and electrical requirements of a firewall cell. It should be noted that firewall cells 60 may be just similarly implemented in functional block 56 or anywhere else in IC 50 and thus giving an enhanced flexibility to the chip designer. System 40 may comprise several IC 50 units which may be in active connection with one or more other IC units of system 40.

Firewall cell 60 may be embodied, for example, using an N-well technique to enable electrical isolation of firewall cell 60 from block 52 or from block 56 or from other blocks, as may be required. Firewall cell 60 may be powered by an un-gated power source $Vcc_2$ from a layer in IC 50 having constant supply voltage. Providing connection of a firewall cell 60 to an un-gated power supply may be carried out by for example providing a special built-in power pin or connector in firewall cell 60 which may be connected to a constantly powered layer. In the cases of an IC with a high density layout the supply un-gated power to firewall cell 60 may be embodied by for example a via-stack technique.

A system using an IC designed and operated according to embodiments of the present invention may include for example a hand held mobile product such as a cell phone, smart phone, PDA, ultra-mobile laptop computer, etc. Some of the devices utilizing an IC built and operated according embodiments of the present invention may be part of a wireless communication device using wireless communications technologies which may include radio frequency (RF) and infrared. Non-limiting examples of RF wireless standards are protocols, such as, for example, Bluetooth, IEEE-Std 802.11a, IEEE-Std 802.11b, 1999 edition, IEEE-Std 802.11g and HomeRF. Non-limiting examples of infrared light signals are protocols, such as, for example, InfraRed Data Association (IrDA) standard.

While embodiments of the invention has been described with respect to a limited number of embodiments, it will be appreciated that many variations, modifications and other applications of embodiments of the invention may be made. Embodiments of the present invention may include other apparatuses for performing the operations herein. The appended claims are intended to cover all such modifications and changes.

What is claimed is:

1. An integrated circuit (IC) comprising:
   at least two functional blocks, said at least two functional blocks being provided respectively with supply voltages which are switchable ON or OFF at times independent from each other, wherein a first of the at least two functional blocks receives a first supply voltage and a second of the at least two functional blocks receives a second supply voltage;
   wherein:
      the first of said at least two functional blocks comprises at least one firewall cell embedded in said first functional block, said at least one firewall cell being electrically isolated from said first functional block and powered by a third voltage supply that is available as long as said IC is powered; and
      said at least one firewall cell to be switched ON or OFF with a signal outputted by said first functional block to the second of said at least two functional blocks.

2. The IC of claim 1 wherein said at least one firewall cell is connected to a constant voltage layer in said IC using via-stack connection.

3. The IC of claim 1 wherein said at least one firewall cell is electrically isolated from said first functional block using an N-well technique.

4. The IC of claim 1 wherein the location of said at least one firewall cell in the domain of said first functional block is independent from and unrelated to the location of any other firewall cell embedded in said first functional block.

5. The IC of claim 1 wherein the operation of said at least one firewall cell to switch said signal ON or OFF is coordinated with the providing of voltage supply to said first functional block.

6. A system comprising:
   at least one IC, said at least one IC comprising:
      at least two functional blocks, said at least two functional blocks being provided respectively with supply voltages which are switchable and at least some of the operation times of said IC being independent of each other, wherein a first of the at least two functional blocks receives a first supply voltage and a second of the at least two functional blocks receives a second supply voltage;

wherein:
the first of said at least two functional blocks comprises at least one firewall cell embedded in said first functional block, said at least one firewall cell being electrically isolated from said first functional block and powered by a third voltage supply that is available as long as said IC is powered; and said at least one firewall cell to be switched ON or OFF with a signal outputted by said first functional block to the second of said at least two functional blocks.

7. The system of claim 6 wherein said at least one firewall cell is connected to a constant voltage layer in said IC using stack-via connection.

8. The system of claim 6 wherein said at least one firewall cell is electrically isolated from said first functional block using N-well technique.

9. The system of claim 6 wherein the location of said at least one firewall cell in the domain of said first functional block is independent from and unrelated to the location of any other firewall cell embedded in said first functional block.

10. The system of claim 6 wherein the operation of said at least one firewall cell to switch said signal On of OFF is coordinated with the providing of voltage supply to said first functional block.

* * * * *